G. J. & S. J. SHIMER.
Car-Axle Box.

No. 212,631.  Patented Feb. 25, 1879.

WITNESSES  
Nat. E. Oliphant  
Clarence L. Trevitt

INVENTORS.  
George J. Shimer  
Samuel J. Shimer  
by Heyman & Kane  
attys.

UNITED STATES PATENT OFFICE.

GEORGE J. SHIMER AND SAMUEL J. SHIMER, OF MILTON, PENNSYLVANIA.

IMPROVEMENT IN CAR-AXLE BOXES.

Specification forming part of Letters Patent No. 212,631, dated February 25, 1879; application filed October 28, 1878.

*To all whom it may concern:*

Be it known that we, GEORGE J. SHIMER and SAMUEL J. SHIMER, of Milton, in the county of Northumberland and State of Pennsylvania, have invented a new and valuable Improvement in Lubricators for Car-Axle and other Shaft Bearings; and we do hereby declare that the following is a full, clear, and exact description of the construction and operation of the same, reference being had to the annexed drawings, making a part of this specification, and to the letters and figures of reference marked thereon.

Figure 1:
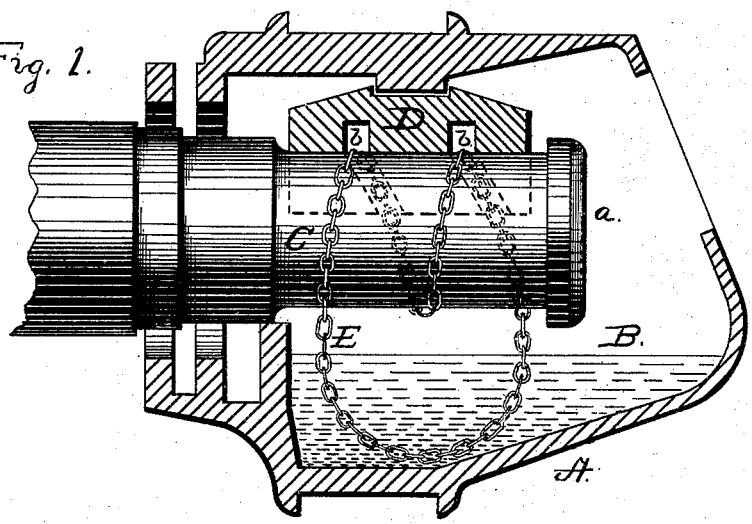
Figure 2:
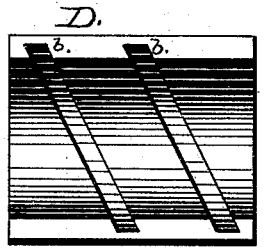

Figure 1 of the drawings is a representation of a central sectional view of a car-box and the top bearing, showing our invention applied thereto. Fig. 2 is a plan view of the top bearing, showing the oblique grooves.

This invention relates to car-axle boxes and other shaft-bearings. Serious objections exist to the means heretofore used for lubricating, wherein an endless chain confined to a straight groove at right angles to the journal-bearing is passed over the journal. The chain in this case touching the journal in a straight line only fails to distribute the oil over the length of the bearing, and by the continual action and weight of the chain in this single direction a groove will be worn rapidly in the journal, thus eventually causing the oil to be confined to the limit of the groove.

To remedy these defects is the main object of our invention; and to this end it consists in an automatic feeding device, whereby the oil is regularly and evenly conveyed to the journal or shaft when in motion from the oil well or chamber below the journal or shaft by an endless chain that is wound obliquely one or more times around the journal or shaft that is to be oiled, entering through ways at one end of the cap or top bearing and passing around the shaft and out through ways at the other end of the bearing, thus coming in contact with the journal or shaft to the full length of the bearing, and carrying oil to every part thereof, as will be hereinafter more fully set forth and specifically claimed.

Our main object is to provide a lubricant conveyer or device for supplying the oil to the journal to the full length of its bearing, so as always to properly supply a sufficient amount of oil from the well below to the journal.

In the annexed drawings, forming a part of this specification, the letter A represents a car-axle box having a lubricant well or chamber, B, and C is the journal of an axle having a collar, $a$, on its end. The letter D indicates the top bearing or brass applied in the usual manner—that is to say, arranged over the journal within the car-box, substantially as shown in Fig. 1 of the drawings. This top bearing or brass is provided with two or more oblique grooves or channels, $b$, forming guideways for a chain, hereinafter described. E is an endless chain helically passed one or more times around the journal, which gives it a tension sufficient to overcome the frictional contact in the oblique ways of the top bearing that guide the chain in its course.

The lubricant is supplied to the journal from the bottom of the oil-well in the following manner: The lower part of the endless chain dipping into the oil-well of the box lifts, by the rotation of the axle-journal, a portion of the oil with it, and distributes it, in its movement, over the shaft-bearing. This movement of the chain, coiling and uncoiling around the journal from end to end, insures the constant contact of the chain with the journal, and the oil carried up by the chain is regularly supplied to the journal. A sufficient quantity of oil adheres to the journal to be communicated by it to the brass or upper bearings and lubricate the surfaces in contact.

The revolution of the journal and the chain enveloping the same, with a portion thereof depending from the journal into the oil, as shown, causes the chain to revolve and change its position, and insures a supply of fresh oil to the journal.

It will be observed that the chain does not traverse a groove that is in line with any section of the revolving journal, but traverses a deflecting guideway, by which means every part of the journal has frictional contact with the bearing, effecting an even wear of the journal. The deflection must necessarily be equal to or greater than the width of the groove traversed by the chain.

If the bearing should be very long two or more endless chains, operating in the manner as above described, may be used. Of course, the chains are to be made of sufficient length to reach the lubricant in the oil-well and convey the same to the bearing.

The motion of the axle-journal may be either forward or backward. The feed of the lubricant substance will be the same.

In lieu of the endless chain a band of felt or wire rope of sufficient width and depth to pass through the grooves in the bearing may be sustituted.

Our invention may also be applied to shaft and other similar bearings.

What we claim as our invention, and desire to secure by Letters Patent, is—

1. The hereinbefore-described self-feeding lubricant-conveyer for journals, consisting of an endless chain, or its equivalent, helically coiled one or more times around the journal above the level of the oil-well, and the lower portion of the chain depending from the journal into the oil.

2. The combination, substantially as hereinbefore described, of a journal, an endless chain helically coiled around the journal with a portion thereof passing through an oil-well, and an upper bearing having two or more oblique grooves for guiding the course of the lubricant-conveyer.

3. In combination with a car-axle box having an oil-well, a journal, a self-feeding lubricant-conveyer, and a top bearing having two or more oblique grooves for the passage of the conveyer, operating in the manner substantially as described.

4. In combination with a journal, an oil-receptacle, and an endless chain, a top bearing having one or more deflecting guideways, for the purpose of effecting an even wear of the journal, substantially as described.

In testimony whereof we have hereunto subscribed our names.

GEORGE J. SHIMER.
SAMUEL J. SHIMER.

Witnesses:
J. F. BLAIR,
S. EULRICH.